Patented Dec. 17, 1940

2,225,266

UNITED STATES PATENT OFFICE 2,225,266

POLYMERIZATION PRODUCT AND PROCESS FOR PRODUCING THE SAME

Frederick E. Frey and Robert D. Snow, Bartlesville, Okla., and Louis H. Fitch, Jr., deceased, late of Bartlesville, Okla., by First National Bank in Bartlesville, administrator, Bartlesville, Okla., assignors to Phillips Petroleum Company, Bartlesville, Okla., a corporation of Delaware No Drawing. Application September 6, 1938, Serial No. 228,702

7 Claims. (Cl. 260—92)

This invention relates to the manufacture of new and useful products, generally of high molecular weight, or polymeric in nature, by causing sulfur dioxide to react with unsaturated compounds other than the olefin or conjugated diolefin hydrocarbons, and to processes by which such reactions can be made to take place.

A further object of the invention is to produce high molecular weight compounds containing sulfur dioxide and having incorporated in the molecule, radicals such as the hydroxyl or carboxyl, capable of undergoing further reaction with suitable chemical agents.

Other objects will appear as the invention is more fully described.

Prior literature references to the reactions of $SO_2$ with unsaturated compounds are confined to the olefin and diolefin hydrocarbons. Mathews and Elder, British 11,635, 1914, claim the reaction of liquid $SO_2$ with olefinic hydrocarbons, such as ethylene, propylene, and butylenes in sunlight or ultra-violet light. DeBruin, Chem. Abs. 9,623 (1915) found that the conjugated diene, isoprene, when allowed to stand with liquid $SO_2$, forms a crystalline compound. Mathews and Strange, U. S. 1,196,259 (1916), react isoprene and other conjugated diolefins with $SO_2$ in the presence of halogen compounds such as HCl, iodine or acetyl chloride, which promote the formation of the crystallizable sulfoxide. Badische Aniline and Sodafabrik. Ger. 236,386 (1911), Staudinger, Ger. 506,839 (1930), and Perkins, Can. 329,043 (1933), disclose the reaction of $SO_2$ with olefins having conjugated double bonds. Leopold Singer in French Patent 515,590 (1921) discloses a process for the production of lacquers, varnishes, etc., by reacting sulfurous acid with mineral oils. In these references to the prior art, no mention is made of the reaction of $SO_2$ with unsaturated compounds other than simple olefins and conjugated diolefins. Furthermore, since methods for the reaction of many of the simple olefinic hydrocarbons are still unknown, it does not necessarily follow from the previous disclosures that unsaturated compounds other than hydrocarbons would react with $SO_2$. We have found, however, that many compounds other than simple olefins and conjugated diolefin hydrocarbons react with $SO_2$ to form high molecular weight polymers of a resinous nature.

We have reacted the following materials with sulfur dioxide:

The unsaturated halogen derivatives, vinyl chloride and allyl chloride react readily with liquid $SO_2$ in the presence of a catalyst or in light. The vinyl chloride forms a white solid which is insoluble in $SO_2$, but which can be molded by heat and pressure. The allyl chloride forms a water white, glassy product somewhat soluble in $SO_2$. After molding by heat and pressure, the resin exhibits high mechanical strength. The unsaturated alcohol, allyl alcohol, reacts readily with $SO_2$ in the presence of catalyst or light. The solid resin obtained has a very high tensile strength.

The unsaturated ether, allyl ethyl ether, reacts readily with $SO_2$ in the presence of catalyst or light. The solid resinous product can be molded by heat and pressure.

The olefin oxides, or inner ethers, ethylene oxide and propylene oxide react relatively more slowly with $SO_2$ in the presence of catalyst or light at temperatures up to 40° C. but preferably at about 0° C. The products are viscous fluids useful as softening agents, plasticizers, and solvents.

Esters of acrylic acid react readily with $SO_2$ in the presence of light or catalyst to form products of desired properties. Ethyl acylate reacts to form a soft, rubbery product soluble in $SO_2$ and many organic solvents.

When $SO_2$ is passed into an unsaturated amine compound such as allylamine, the first energetic reaction is evidently between the —$NH_2$ group and the $SO_2$. If after this reaction is complete, an excess of $SO_2$ is added and the mixture is exposed to light, a further reaction takes place, forming a compound of high molecular weight.

Diallyl, a diolefin not having conjugated double bonds and consequently not being capable of undergoing 1-4 addition of $SO_2$, was found to react rapidly with $SO_2$ to form a white insoluble difficultly fusible solid.

The unsaturated aldehyde, acrolein, reacts slowly with $SO_2$ in the presence of light or catalyst. The reaction can best be carried out at temperatures below atmospheric. The product is a solid insoluble in $SO_2$.

The unsaturated acids, acrylic, allylacetic, and undecylenic react readily with $SO_2$ in the presence of a catalyst or light. The products are insoluble in the excess $SO_2$. They are softer than the products obtained from olefinic hydrocarbons of the same number of carbon atoms, the product of undecylenic acid being very soft and pliable.

The acetylene derivatives, ethyl acetylene and phenyl acetylene, react with $SO_2$ in the presence of light or a catalyst.

The acetylene polymers, vinyl acetylene, divinyl acetylene, and poly-divinylacetylene, react slowly in liquid SO₂ in the light or in the presence of a catalyst to form an insoluble brown solid.

The furane derivative, furfuryl alcohol, reacts with SO₂ in the light or in the presence of a catalyst. A jet black solid material which is practically insoluble and can be molded only at high temperatures and pressures is formed.

Other compounds which we have converted to resins by reaction with SO₂ are: allyl cyanide, allyl isothiocyanate, allyl thiourea, and allyl urea.

Other materials which should react with SO₂ are: crotonyl alcohol, chloroprene, bromoprene, unsaturated vegetable oils such as tung oil, and partially chlorinated olefins such as the dichloride of diallyl.

In most cases we have found that the treatment of the unsaturated product to remove any absorbed oxygen and oxidation products prior to reaction is desirable.

Although the reaction involves approximately equimolecular proportions of SO₂ and unsaturated compound, the reaction product usually removes excess SO₂ from the reaction phase in the adsorbed or dissolved form. It is, therefore, generally desirable to use more than the molecular equivalent of SO₂.

Any of the catalysts for these reactions previously discovered and disclosed can be used, insofar as they are compatible with the unsaturated compound to be converted to resin.

Resinous products formed from mixtures of simple olefinic hydrocarbons and other unsaturated compounds appear to have properties which are generally intermediate between those formed from the individual constituents.

In many ways the production of resins from such compounds as unsaturated halogen derivatives, alcohols, ethers, esters, acids and aldehydes, or materials containing them, by reaction with SO₂ is highly desirable and advantageous. It would permit the production of resins having special properties; for example the allyl alcohol-SO₂ resin has unusually high tensile strength, while the undecylenic acid-SO₂ and ethyl acrylate-SO₂ resins are soft and rubbery. Then, too, a resin in which is tied up such a compound of multiple functions should be capable of further modification of properties by other chemical reactions after formation of the SO₂ complex. Apparently only the carbon to carbon double bond is involved in the resin reaction, leaving the other functional groups, such as hydroxyl or carboxyl, more or less free to undergo its characteristic reactions. Thus, an allyl alcohol resin or an acrylic acid resin might be esterified in the usual manner with acid anhydrides or alcohols, respectively, to produce resins with a wide range of properties. Properties of the resinous products produced may be modified to improve the physical characteristics and moldability of the resin, as well as its solubility by reacting SO₂ with a mixture of a simple olefin or olefins and an unsaturated compound such as esters of acrylic acid, acrylic acid, undecylenic acid, and allyl acetic acid. Resins formed from these mixtures are particularly valuable because of the improvement in characteristics such as softening and solubility due to the incorporation of the unsaturated acid or acid derivative in the heteropolymeric olefin-SO₂ molecule.

We have produced useful resinous products by the reaction of SO₂ with unsaturated compounds other than simple olefinic hydrocarbons and conjugated diolefinic hydrocarbons, have blended the resins so obtained with resins formed by the reaction of SO₂ with simple olefins and/or diolefins in order to modify the properties of the latter and have also mixed such unsaturated compounds with the simple olefins and diolefins and reacted the mixture with SO₂ under the proper conditions.

The following examples will illustrate the process of the present invention.

I. Equal volumes of liquid SO₂ and allyl chloride are sealed in a glass tube and exposed to sunlight or artificial light, preferably of short wave length. After the reaction has gone to completion, as indicated by the conversion of the fluid reactants to a stiff gel, the excess SO₂ is allowed to evaporate, leaving a white solid resin.

As a variation of the above, suitable for larger scale operation, the mixture of SO₂ and allyl chloride is placed in a bomb or autoclave provided with a suitable source of internal illumination and the reaction is promoted photochemically.

II. Equal volumes of liquid SO₂ and allyl alcohol are placed in a bomb or autoclave containing 0.01-0.1 percent of silver nitrate, or other suitable catalyst and are allowed to react after thorough mixing. After the reaction has gone to completion, the excess SO₂ is allowed to escape and the solid resin is removed from the vessel.

III. To a mixture of 25 parts by weight of undecylenic acid and 75 parts of propylene was added somewhat more than twice its weight of liquid sulfur dioxide. After mixing, a catalyst solution consisting of 5% alcoholic lithium nitrate solution in ethyl alcohol was added at the rate of 2 percent of the weight of the reaction mixture. The mixture was agitated while reaction was taking place. After completion of the reaction, the excess sulfur dioxide was removed. A resin having much better plasticity than that of propylene-sulfur dioxide resin was obtained. The product when molded also showed much less tendency to crack than the ordinary propylene sulfur dioxide resin.

IV. A mixture of 20 parts of propylene, 10 parts of methyl undecylenate and 80 parts of sulfur dioxide was caused to react in a pressure vessel by the addition of 2 parts of 5% alcoholic lithium nitrate solution. The mixture was agitated during reaction. At the end of the reaction the excess sulfur dioxide was expelled and there remained a resin having a higher solubility and elasticity than the product made from propylene alone.

We may also use other unsaturated acids and their esters, such as acrylic, allyl acetic, which will themselves react with sulfur dioxide in the absence of olefin hydrocarbons, in admixtures with olefin hydrocarbons. We prefer to use unsaturated acids, or their esters in which the double bond is located at or near the end of the molecule opposite the carboxyl group and in which no branching of the hydrocarbon chain occurs at the double bond.

This application is based upon applicants' Patent 2,114,292, issued April 19, 1938. The invention covered by the patent relates to the reaction of sulfur dioxide with vinyl and allyl chlorides whereas the invention claimed herein relates to the reaction of sulfur dioxide with certain acetylenic compounds.

We claim:

1. The process of producing high molecular weight heteropolymeric products which comprises reacting sulfur dioxide with an acetylene selected from the group consisting of ethyl acetylene, phenylacetylene, vinyl acetylene, divinyl acetylene and poly-divinyl acetylene.

2. The process of producing high molecular weight heteropolymeric products which comprises reacting sulfur dioxide with ethyl acetylene.

3. The process of producing high molecular weight heteropolymeric products which comprises reacting sulfur dioxide with phenyl acetylene.

4. The process of producing high molecular weight heteropolymeric products which comprises reacting sulfur dioxide with vinyl acetylene.

5. As a new composition of matter, a high molecular weight heteropolymer of sulfur dioxide and ethyl acetylene.

6. As a new composition of matter, a high molecular weight heteropolymer of sulfur dioxide and phenyl acetylene.

7. As a new composition of matter, a high molecular weight heteropolymer of sulfur dioxide and vinyl acetylene.

FIRST NATIONAL BANK IN BARTLESVILLE,
*Administrator of the Estate of Louis H. Fitch, Jr., Deceased.*
By J. F. CRONIN,
*Vice-President.*
FREDERICK E. FREY.
ROBERT D. SNOW.